(12) United States Patent
Liau

(10) Patent No.: US 6,411,004 B1
(45) Date of Patent: Jun. 25, 2002

(54) INTERNALLY LOADED UNIVERSAL MOTOR

(75) Inventor: Bun-Liou Liau, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/636,704

(22) Filed: Aug. 11, 2000

(51) Int. Cl.[7] .................. H02K 7/102; H02K 5/24
(52) U.S. Cl. .................. 310/158; 310/77; 310/93; 310/51
(58) Field of Search .................. 310/158, 245, 310/90, 233, 234, 235, 236, 237, 51, 92, 93, 77; H02K 23/64

(56) References Cited

U.S. PATENT DOCUMENTS 2,482,840 A * 9/1949 Collins et al. .............. 318/372
4,185,214 A * 1/1980 Gerber et al. .............. 310/51
5,497,039 A * 3/1996 Blaettner .................. 310/51

FOREIGN PATENT DOCUMENTS

JP  8-266008  * 10/1996  .................. 310/77

* cited by examiner

*Primary Examiner*—Karl Tamai
(74) *Attorney, Agent, or Firm*—Winston Hsu

(57) ABSTRACT

An internally loaded universal motor has a stator, a rotor, brushes and a loading device for generating an internal load on the universal motor. The shaft has a commutator, and a rotor core adjacent to the commutator. The rotor core is electrically connected to the commutator and rotates within the stator. The brushes deliver electrical power to the commutator. The loading device prevents excessive rotation of the rotor when the universal motor has a low external load.

12 Claims, 4 Drawing Sheets

INTERNALLY LOADED UNIVERSAL MOTOR

BACKGROUND OF THE INVENTION

1. Field of the Invention

The present invention relates to a universal motor. More specifically, the present invention discloses a universal motor that has an internal load for preventing excessive rotation of the motor when the motor has a light external load.

2. Description of the Prior Art

Universal motors are electric motors that, because of their ability to accept both AC and DC power sources, can be found quite readily in the market place, such as in cordless powered screwdrivers, blenders, etc. Universal motors are also in wide use in industry, as they have a simple, reliable design.

Please refer to FIG. 1. FIG. 1 is an exploded view diagram of a prior art universal motor 10. The universal motor 10 comprises a stator 20, a rotor 30 and end brackets 50 and 70. The rotor 30 has a shaft 32 onto which are mounted a commutator 34 and a rotor core 36. The rotor core 36 is wound with copper wire to form many individual groups of windings 38. Each of these windings 38 is electrically connected to a corresponding surface 35 on the commutator 34. The ends of the shaft 32 are rotatably fixed in bushings 52 and 72 of the end brackets 50 and 70, respectively. The end brackets 50 and 70 are firmly mounted onto the stator 20. Hence, the rotor core 36 rotates within the stator 20, and the commutator 34 rotates with the rotor core 36. The stator 20 also has many windings 22, which have leads 24 for delivering electrical power to the windings 22. The end bracket 50 comprises brush holders 60 for elastically holding brushes 62 in contact with the commutator 34. Electrical power is delivered by the brushes 62 to the commutator 34, and hence to the appropriate windings on the rotor core 36. Each brush holder 60 comprises a socket 61 into which a brush 62 is slidably disposed, a spring 64 for elastically pushing the brush 62 towards the commutator 34, and an external contact 66. The external contact 66 is electrically connected to the brush 62, and is used to deliver electrical power to the brush 62. Wires 68 lead off from the external contacts 66 to a power source (not shown).

When operating under a proper external load, the universal motor 10 will spin at a given RPM (revolutions per minute) with a given torque. Please refer to FIG. 2, which is a graph of torque versus RPM for the universal motor 10. Generally speaking, the relationship of torque versus RPM for the universal motor 10 is a linear one. Hence, when the universal motor 10 has a light external load, its rotational speed will increase dramatically. This rapid rotation of the universal motor 10 is a significant source of unwanted noise.

SUMMARY OF THE INVENTION

It is therefore a primary objective of this invention to provide a universal motor that has an internal load to prevent excessive rotation when the motor has a light external load.

The present invention, briefly summarized, discloses an internally loaded universal motor that has a stator, a rotor, brushes and a loading device for generating an internal load on the universal motor. The shaft has a commutator, and a rotor core adjacent to the commutator. The rotor core is electrically connected to the commutator and rotates within the stator. The brushes deliver electrical power to the commutator. The loading device prevents excessive rotation of the rotor when the universal motor has a low external load.

It is an advantage of the present invention that the internal load insures that the universal motor always has at least a slight load when there is a very low, or no, external load. By always providing a load on the universal motor, the rotational speed of the motor is kept down, which helps to reduce the noise emanating from the motor.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
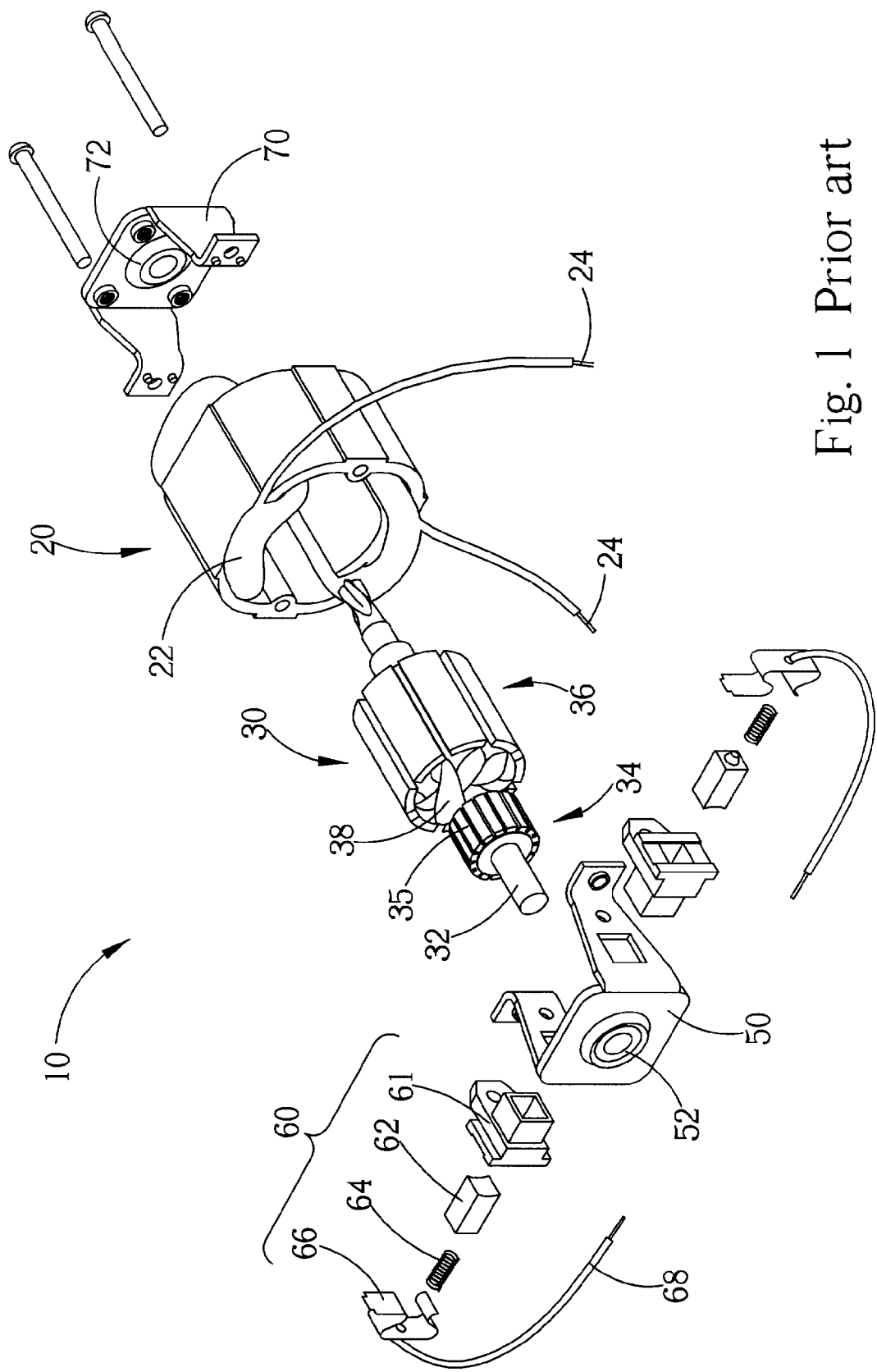
FIG. 1 is an exploded view diagram of a prior art universal motor.
Figure 2:
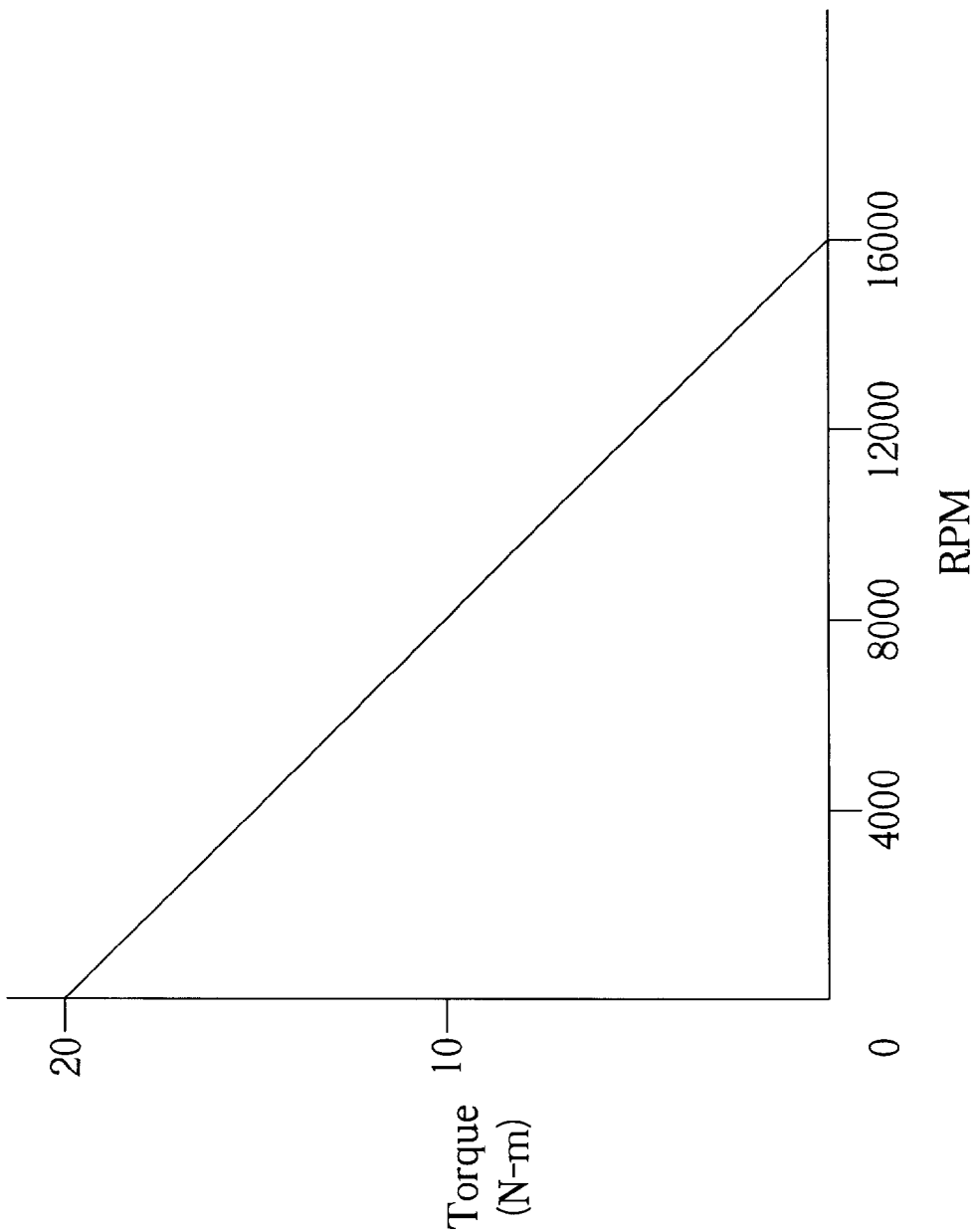
FIG. 2 is a graph of torque versus RPM for the universal motor of FIG. 1.
Figure 3:
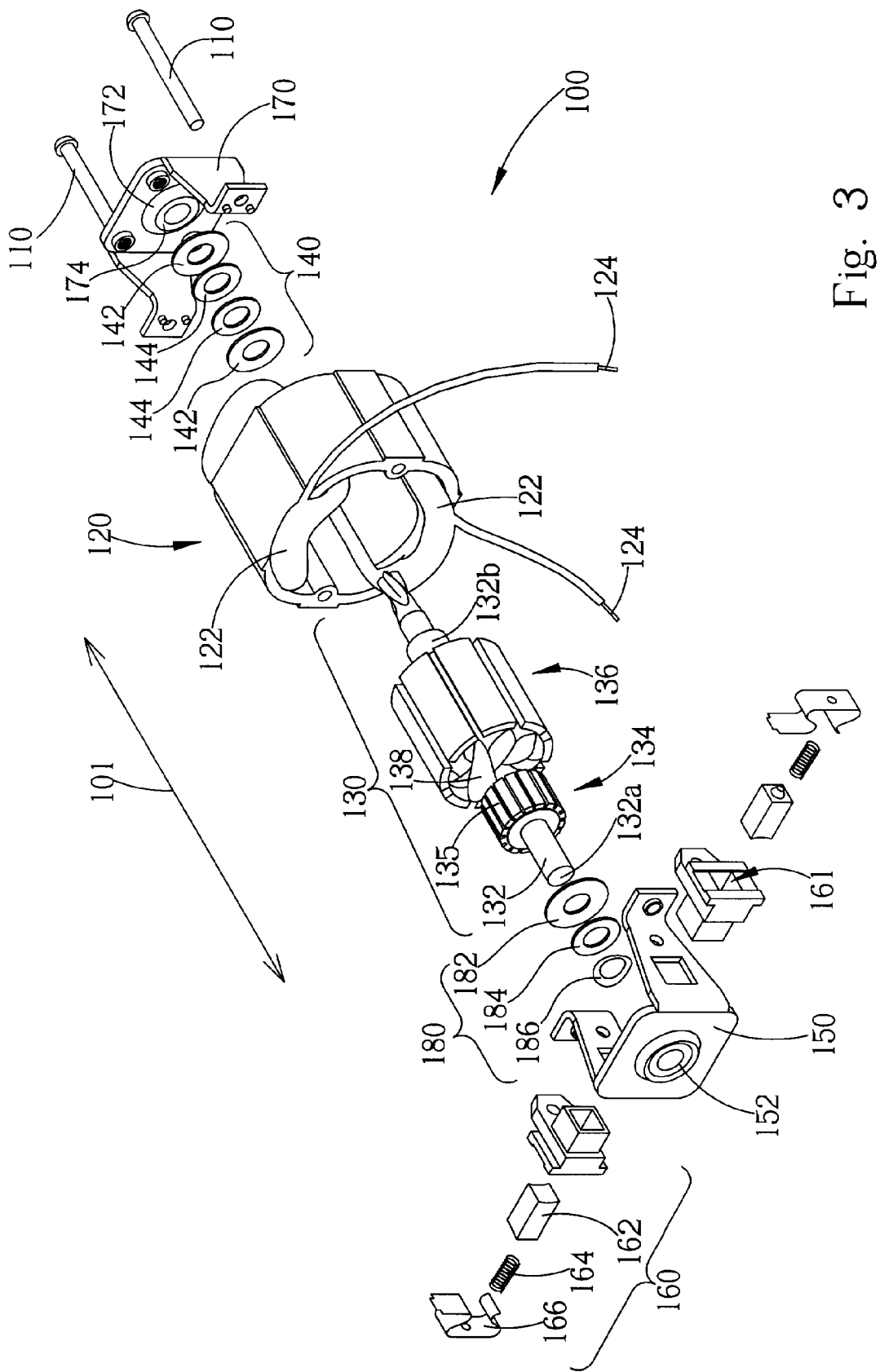
FIG. 3 is an exploded view diagram of a present invention universal motor.

Please refer to FIG. 3. FIG. 3 is an exploded view diagram of a present invention universal motor 100. The universal motor 100 comprises a stator 120, a rotor 130, a first end bracket 170, a second end bracket 150, a friction plate assembly 140 and an elastic assembly 180. The rotor 130 has a shaft 132 onto which are mounted a commutator 134 and a rotor core 136 adjacent to the commutator 134. The rotor core 136 is wound with copper wire to form many groups of windings 138. Each of these windings 138 is electrically connected to a corresponding electrically conductive surface 135 on the commutator 134. First end 132b and second end 132a of the shaft 132 are rotatably fixed in bushings 172 and 152 of the first end bracket 170 and second end bracket 150, respectively. The end brackets 150 and 170 are firmly mounted onto the stator 120 by way of bolts 110. Hence, the rotor core 136 rotates within the stator 120, and the commutator 134 rotates inside the end bracket 150 with the rotor core 136. The shaft 132 also has a limited amount of freedom of movement along a longitudinal direction 101. That is to say, the ends 132a and 132b of the shaft 132 can slide within their respective bushings 152 and 172 along the longitudinal direction of the shaft 132, the arrow 101. The stator 120 has many windings 122, which have leads 124 for delivering electrical power to the windings 122. The end bracket 150 comprises brush holders 160 for elastically holding brushes 162 in contact with the commutator 134. Electrical power is delivered by the brushes 162 to the commutator 134, and hence to the appropriate windings on the rotor core 136. Each brush holder 160 comprises a socket 161 into which a brush 162 is slidably disposed, a spring 164 for elastically pushing the brush 162 towards the commutator 134, and an external contact 166. The external contacts 166 are electrically connected to their respective brushes 162, and are used to deliver electrical power to the brushes 162.

The friction plate assembly 140 and the elastic assembly 180 work together as a loading device to create a persistent internal load for the universal motor 100. The friction plate assembly 140 is mounted on the first end 132b of the shaft 132 and includes two plastic washers 142 sandwiching together two thin metal washers 144. As the shaft 132 rotates, it is pushed by the elastic assembly 180 towards the first end bracket 170. This creates a pressure on the washers 142 and 144 of the friction plate assembly 140, which rub against each other, as well as against a surface 174 on the first end bracket 170. The contact friction generated by the washers 142 and 144, and the surface 174, places a small but persistent internal load on the universal motor 100. This persistent internal load slows the rotational speed of the rotor 130 of the universal motor 100 when it has a light external load, thus preventing excessive rotational speeds that lead to undesirable levels of noise.

The elastic assembly 180 is mounted on the second end 132a of the shaft 132 and includes a plastic insulating washer 182, a thin metal washer 184 and a spring washer 186. The insulating washer 182 simply ensures that no electrical connection is formed between the commutator 134 and the end bracket 150. The spring washer 186 elastically pushes on the end bracket 150 and the commutator 134 via the washers 184 and 182. This force from the spring washer 186 drives the shaft longitudinally towards the first end bracket 170. Furthermore, the washers 182, 184 and 186 also generate rotational friction amongst themselves and the second end bracket 150, which adds to the internal loading of the universal motor 100.

Figure 4:
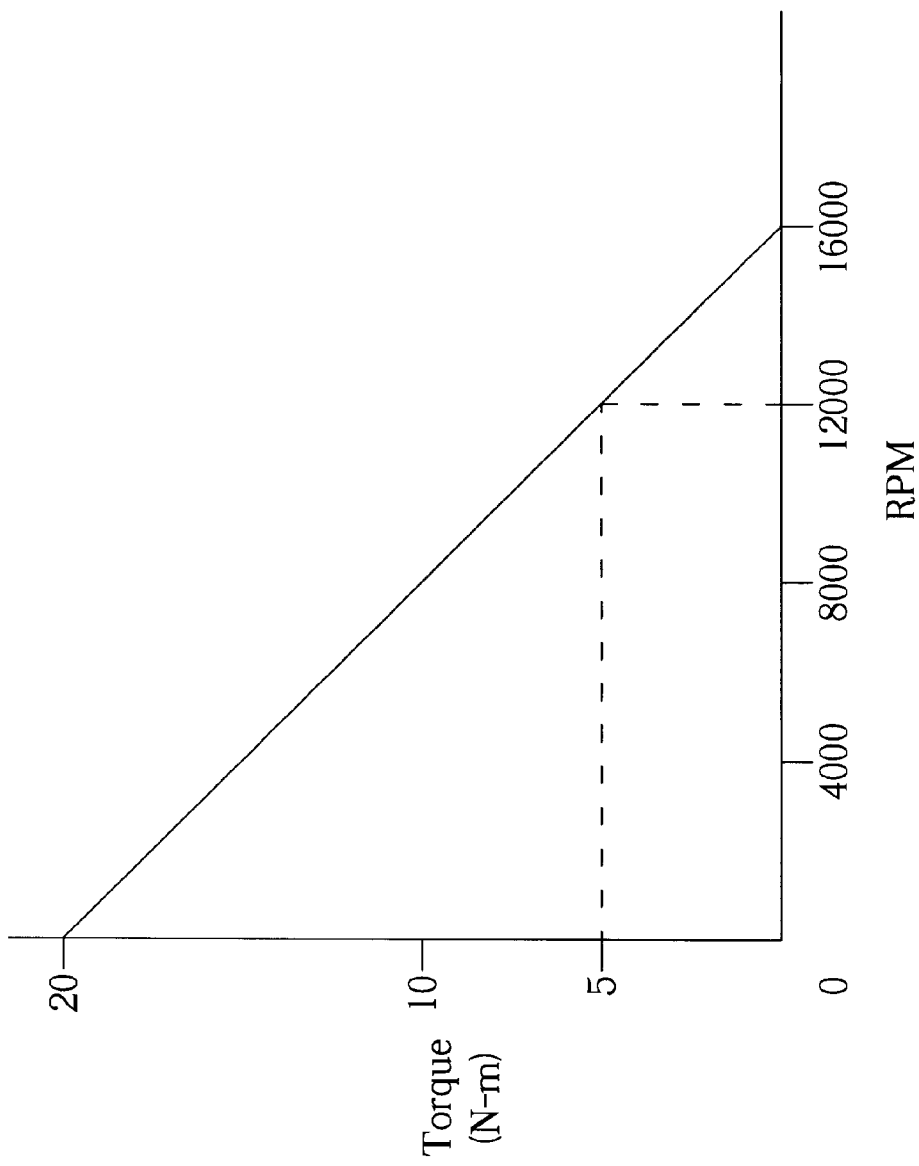
FIG. 4 is a graph of torque versus RPM for a universal motor of the present invention.

By carefully choosing the proper arrangements and types of washers used in both the elastic assembly 180 and the friction plate assembly 140, it is possible to generate an internal load on the universal motor 100 with the desired loading characteristics. For example, two sets of friction plate assemblies 140 may be mounted on the end 132b of the shaft 132, or the elastic force of the spring washer 186 may be adjusted. In any event, when the universal motor 100 has a light, or no, external load, the overall internal load generated by the friction plate assembly 140 and elastic assembly 180 should be made just sufficient to bring down the rotational rate of the universal motor 100 to a rate that has an acceptable amount of noise. For example, please refer to FIG. 4. FIG. 4 is a graph of torque versus RPM for the universal motor 100. The universal motor 100 may become unacceptably noisy when the shaft 132 exceeds 12,000 RPM. Normally, when the universal motor 100 has no load whatsoever, it will operate at 16,000 RPM. By adjusting the friction plate assembly 140 and the elastic assembly 180 to place a persistent internal load of 5 Newton-meters on the universal motor 100, the shaft 132 is ensured to never exceed 12,000 RPM. Thus, the universal motor 100 is kept within acceptable noise limits.

In contrast to the prior art, the present invention has an elastic assembly and a friction plate assembly mounted on a rotor shaft with a small degree of longitudinal movement. The elastic assembly places a force on the friction plate assembly, and together they generate rotational friction that places a persistent internal load on the universal motor. This persistent internal load reduces the rotational speed of the shaft when the universal motor has a light external load. By reducing the maximum rotational speed of the shaft when the universal motor has a light, or no, external load, the noise generated by the universal motor is reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An internally loaded universal motor comprising:
   a stator;
   a rotor comprising a shaft, a commutator mounted on the shaft, and a rotor core mounted on the shaft adjacent to the commutator, the rotor core electrically connected to the commutator, the rotor core rotatably mounted within the stator;
   brushes for delivering electrical power to the commutator; and
   a friction plate assembly for generating an internal load on the universal motor; wherein the internal load is used to slow rotation of the rotor to reduce noise;
   a first end bracket and a second end bracket, the first and second end brackets fixed to the stator; wherein a first end of the shaft is rotatably mounted on the first end bracket, a second end of the shaft is rotatably mounted on the second end bracket, and the shaft is capable of longitudinal movement
   wherein the friction plate assembly comprises: a surface on the first end bracket; and a washer mounted on the first end of the shaft; and
   the universal motor further comprising an elastic assembly for elastically pushing the shaft towards the first end bracket so that the washer is pressed against the surface on the first end bracket; and
   wherein the internal load comprises a load generated by friction between the washer and the surface on the first end bracket; and
   wherein the elastic assembly is mounted on the second end of the shaft and elastically pushes against the second end bracket; and
   wherein the elastic assembly is mounted between the commutator and the second end bracket, and the elastic assembly comprises an insulating washer and a spring washer, the spring washer mounted between the second end bracket and the insulating washer.

2. The universal motor of claim 1 wherein the friction plate assembly comprises at least two washers mounted on the first end of the shaft, and the universal motor further comprises an elastic assembly for elastically pushing the shaft towards the first end bracket so that the washers are pressed against each other, the internal load comprising a load generated by friction between the washer.

3. The universal motor of claim 2 wherein the elastic assembly is mounted on the second end of the shaft and elastically pushes against the second end bracket.

4. The universal motor of claim 3 wherein the friction plate assembly further comprises at least a plastic washer.

5. The universal motor of claim 4 wherein the elastic assembly is mounted between the commutator and the second end bracket, and the elastic assembly comprises an insulating washer and a spring washer, the spring washer mounted between the second end bracket and the insulating washer.

6. The universal motor of claim 3 wherein the internal load further comprises a load generated by friction between the elastic assembly and the second end bracket.

7. An internally loaded universal motor comprising:
   a stator;
   a rotor comprising a shaft, a commutator mounted on the shaft, and a rotor core mounted on the shaft adjacent to the commutator, the rotor core electrically connected to the commutator, the rotor core rotatably mounted within the stator;

brushes for delivering electrical power to the commutator; and a friction plate assembly for generating an internal load on the universal motor; wherein the internal load is used to slow rotation of the rotor to reduce noise;

a first end bracket and a second end bracket, the first and second end brackets fixed to the stator, wherein a first end of the shaft is rotatably mounted on the first end bracket, a second end of the shaft is rotatably mounted on the second end bracket, and the shaft is capable of longitudinal movement wherein the friction plate assembly comprises: a surface on the first end bracket; and a washer mounted on the first end of the shaft; and the universal motor further comprising an elastic assembly for elastically pushing the shaft towards the first end bracket so that the washer is pressed against the surface on the first end bracket; and wherein the internal load comprises a load generated by friction between the washer and the surface on the first end bracket; and wherein the elastic assembly is mounted on the second end of the shaft and elastically pushes against the second end bracket; and wherein the internal load further comprises a load generated by friction between the elastic assembly and the second end bracket.

8. The universal motor of claim 7 wherein the friction plate assembly comprises at least two washers mounted on the first end of the shaft, and the universal motor further comprises an elastic assembly for elastically pushing the shaft towards the first end bracket so that the washers are pressed against each other, the internal load comprising a load generated by friction between the washers.

9. The universal motor of claim 8 wherein the elastic assembly is mounted on the second end of the shaft and elastically pushes against the second end bracket.

10. The universal motor of claim 9 wherein the friction plate assembly further comprises at least a plastic washer.

11. The universal motor of claim 10 wherein the elastic assembly is mounted between the commutator and the second end bracket, and the elastic assembly comprises an insulating washer and a spring washer, the spring washer mounted between the second end bracket and the insulating washer.

12. The universal motor of claim 9 wherein the internal load further comprises a load generated by friction between the elastic assembly and the second end bracket.

* * * * *